3,444,303
Patented May 13, 1969

3,444,303
**DODECACHLOROOCTAHYDRO - 1,3,4 METH-
ENO-2H CYCLOBUTA (cd) PENTALENE AS A
RODENTICIDE**
Merrill M. Darley, Basking Ridge, N.J., assignor to Allied
Chemical Corporation, New York, N.Y., a corporation
of New York
No Drawing. Filed Feb. 16, 1965, Ser. No. 433,208
Int. Cl. A01n *17/14, 9/30*
U.S. Cl. 424—352                                1 Claim

ABSTRACT OF THE DISCLOSURE

The following invention relates to a method for exterminating rodents using dodecachlorooctahydro-1,3,4-metheno-2H cyclobuta (cd) pentalene.

---

The present invention relates to a new rodenticide, and more particularly, to rodent baits containing dodecachlorooctahydro-1,3,4-metheno-2H cyclobuta (cd) pentalene, a hexachlorocyclopentadiene dimer, as the active toxic ingredient.

It has long been recognized by those concerned with the problem of exterminating rodents that the use of poisonous baits is the only economically feasible method of eradicating these undesired mammals. Although numerous compounds have been suggested and used as poisonous constituents of baits, many disadvantages have accompanied use of the heretofore known rodent poisons. Strychnine sulfate, phosphorus paste, zinc phosphide, white arsenic, thallium sulfate, ANTU, sodium fluoroacetate and warfarin are such fast-killing poisons that they constitute a great hazard to human beings and domestic animals. For example, sodium fluoroacetate is so toxic that the material is not available to the general public and can only be utilized by pest control operators and governmental agencies. Due to the relatively odorless and tasteless properties of white arsenic, great care must be used in preparing and distributing baits so that human beings and domestic animals are not injured. Since the water-soluble arsenic is readily absorbed, care must be taken to avoid skin contact with solutions containing this poison.

Although other less hazardous rodenticides have been developed, the effectiveness of these poisons generally diminishes after repeated applications. Red squill, for example, loses its toxicity if permitted to stand for long periods of time, and the rodent sought to be exterminated becomes extremely cautious of squill baits if they survive the first baiting. Moreover, these rodenticides are generally quite costly or in short supply.

In general, the greatest deficiency of the prior art rodenticides is that they are not readily acceptable in baits by the rodents sought to be eradicated.

Accordingly, it is an object of this invention to provide a rodenticide which is safe in handling, stable, inexpensive and highly lethal after repeated applications to rodents but not lethal (except in large amounts) to human beings and domestic animals. Another object is to provide a rodenticide which is acceptable to rodents when admixed with any suitable solid bait material.

I have now found that compositions comprising solid baits containing dodecachlorooctahydro-1,3,4-metheno-2H cyclobuta (cd) pentalene as active ingredient may be employed to eradicate various rodents such as gophers, rats and mice. It was surprising that compositions containing dodecachlorooctahydro-1,3,4-metheno-2H cyclobuta (cd) pentalene were effective rodenticides since laboratory determinations of the toxicity of this compound indicated that it possessed little toxicity to mammals. For example, the acute oral toxicity (number of milligrams of active ingredient per kilogram of body weight necessary to kill 50 percent of the mammals tested) of dodecachlorooctahydro - 1,3,4 - metheno - 2H cyclobuta (cd) pentalene in aqueous suspension was determined to be approximately 6,000 milligrams per kilogram and 10,000 milligrams per kilogram for male and female albino rats respectively. Even when completely dissolved in corn oil, the acute oral toxicity of this compound was found to be approximately 312 milligrams per kilogram and 700 milligrams per kilogram for male and female albino rats respectively. These values indicated that the compound would be unable to kill rodents in the relatively small dosages required for a practical rodenticide. However, despite its low toxicity, especially when compared with toxicities of the prior art rodenticides, this compound has been unexpectedly found to be an effective rodenticide by virtue of its ready acceptance in baits by the rodents. The effectiveness of the compound is apparently due to its freedom from objectionable characteristics which insures sufficient consumption by the rodent to attain the required fatal concentration. At the same time, the desired fatal concentration is readily attained since the compound has been found to be cumulatively stored in the body of the rodent until the lethal dosage has been consumed. In addition, the compound is safe to handle, inexpensive to produce and may be stored over long periods of time without losing its effectiveness. There is some delay between ingestion of the compound and death of the rodent, and this has proved to be a further advantage in that the rodents are able to leave the infested area if they wish to do so, thus lessening the danger of odor and disease-carrying parasites from their decomposing bodies.

The active ingredient of the present novel compositions, namely dodecachlorooctahydro-1,3,4-metheno-2H cyclobuta (cd) pentalene, is a white, crystalline free-flowing solid having the empirical formula $C_{10}Cl_{12}$, a molecular weight of 546 and a melting point of 485° C. It may be conveniently prepared by heating the reaction product of hexachlorocyclopentadiene and sulphur trioxide with phosphoruspentachloride as is described and claimed in United States Patent 2,702,305.

The compositions of my invention comprise dodecachlorooctahydro-1,3,4-metheno-2H cyclobuta (cd) pentalene as toxic ingredient in a solid food acceptable to rodents. The rodents do not appear either to detect the presence of the poison or do not object to it if they do detect it.

The compound can be utilized in a variety of solid baits. Cereal baits such as wheat, corn, rice and oatmeal, chicken scratch feeds, corn flakes, chicken mash, bread, peanuts, peanut butter, raw bacon, meal baits such as hamburger, granulated dog food and fish, fresh fruits and vegetables are illustrative as suitable substrates for the active ingredient. The compositions may be prepared by any conventional manner. Dodecachlorooctahydro-1,3,4-metheno-2H cyclobuta (cd) pentalene may simply be admixed with the solid bait by shaking or ground together with a wet food to form a paste. A particularly effective rodenticidal composition may be prepared by wetting a solid food such as wheat kernals or oat groats with a solution containing dodecachlorooctahydro-1,3,4-metheno-2H cyclobuta (cd) pentalene. In preparing such compositions the compound may be dissolved in any solvent which would be non-repelling to the rodents and compatible with the solid food. Vegetable oils such as corn oil, peanut oil and cotton seed oil, and benzene, xylene, acetone, ethylene dichloride, isophorone and dioxan are illustrative suitable solvents for this purpose.

The concentration of dodecachlorooctahydro-1,3,4-metheno-2H cyclobuta (cd) pentalene may vary somewhat with the type of composition and with the rodent to be controlled. In general, despite its low toxicity to mammals, surprisingly low concentrations of dodecachlorooctahydro-1,3,4-metheno-2H cyclobuta (cd) pentalene in the new compositions give effective rodenticidal control due to the cumulative effect of the compound when consumed over extended periods of time. The compositions, however, preferably contain at least about 2.0 per cent of dodecachlorooctahydro-1,3,4-metheno-2H cyclobuta (cd) pentalene based on the solids content of the compositions. Usually, concentrations between about 0.5 and about 5 per cent are satisfactory.

The following examples illustrate the invention but are not to be construed as limiting the same.

Example 1

Two grams of dodecachlorooctahydro-1,3,4-metheno-2H cyclobuta (cd) pentalene were dissolved in 20 cc. of benzene and impregnated on 100 grams of carefully sized white wheat. The test animal employed was the native deer mouse (*Peromyscus maniculatus*), live-trapped from the wild for this purpose. Ten individually caged mice (male and female) were offered 25 kernels of the treated wheat each day for 10 consecutive days. The treated seed was counted into and out of the test cage every 24 hours because urine and fecal contamination preclude accurate weight determinations. Prior to the beginning of the test it was determined that each mouse in the series would consume a minimum of 50 kernels of clean wheat each day, twice the quantity of treated wheat subsequently offered. Laboratory rat food pellets were available in the cages as a sustaining ration during both the prebait and test periods. This food is generally not eaten when adequate quantities of clean kernel grain or seeds are available. The selection of food low in the preference scale as a buffer-sustaining ration serves to provide a repellency index for the treated wheat.

The results of the index showed that the per cent reduction of the impregnated wheat intake was 9.6 percent accompanied by a 100 percent mortality, all mice succumbing between the third and seventh overnights.

The above results demonstrate lack of any characteristics which repel the test rodent and reflect the rapid cumulative toxicity of the present rodenticide to this species of rodent.

Example 2

Two grams of dodecachlorooctahydro-1,3,4-metheno-2H cyclobuta (cd) pentalene and 3 cc. of corn oil were hand ground in a mortar to a paste and impregnated on 100 grams of wheat.

The test outlined in the previous example was repeated using this formulation as the rodenticidal composition.

The results of the test disclosed that the per cent reduction of the impregnated wheat intake was 11 percent accompanied again by a 100 percent mortality, all mice dying between the fourth and sixth overnights.

These results again indicate satisfactory acceptance by the rodent of the rodenticide of this invention.

Results similar to those disclosed in Example 1 were obtained when pocket gophers (Thomomys) were fed a bait containing 2 percent of dodecachlorooctahydro-1,3,4-metheno-2H cyclobuta (cd) pentalene applied on oat groats from a benzene solution and also when fed a bait containing 10 percent of dodecachlorooctahydro-1,3,4-metheno-2H cyclobuta (cd) pentalene coated on oat groats by use of a 1 percent corn oil solution.

Example 3

This controlled experiment demonstrates the cumulative toxicity effect of dodecachlorooctahydro-1,3,4-metheno-2H cyclobuta (cd) pentalene.

A group of 30 young albino rats, 15 males and 15 females, served as experimental animals and a second group of 10 young albino rats, 5 males and 5 females, was carried as a control. The experimental rats were dosed by stomach tube with $\frac{1}{10}$ of the acute oral toxicity (L.D.$_{50}$) daily, including Sundays, until the last experimental rat died. Dodecachlorooctahydro-1,3,4-metheno-2H cyclobuta (cd) pentalene was prepared as a 5 percent solution in corn oil at 37° C. and the material was administered at this temperature. The oral L.D.$_{50}$ of this compound in corn oil was previously disclosed in the above text to be approximately 312 milligrams per kilogram for male rats and approximately 700 milligrams per kilogram for female rats. The controls received an equivalent amount of corn oil by stomach tube on each dosing day. The results on body weight and mortality are summarized in the following table:

TABLE

| Rats treated | Av. wt. on indicated day | | | | No. dying | No. doses preceding death |
|---|---|---|---|---|---|---|
| | 0 | 4 | 8 | 12 | | |
| Female: | | | | | | |
| Control | 174 | 177 | 188 | 193 | 0 | |
| Exptl | 156 | 134 | 122 | 100 | 15 | 3(2), 4(4), 6(2), 7(1), 8(2), 9(1), 10(2), 13(1).[1] |
| Male: | | | | | | |
| Control | 138 | 162 | 180 | 205 | 1 | |
| Exptl | 140 | 125 | 110 | 103 | 15 | 6(4), 8(3), 9(4), 10(2), 11(1), 17(1). |

[1] ( ) = Number of animals that died after having received the total number of doses indicated.

I claim:

1. A method for exterminating rodents which comprises feeding rodents a composition containing as its toxic ingredient an effective amount of dodecachlorooctahydro-1,3,4-metheno-2H cyclobuta (cd) pentalene and a solid bait for said toxic ingredient.

References Cited

UNITED STATES PATENTS 2,671,043  3/1954  Gilbert _____ 167—30
3,096,239  7/1963  Hoch _____ 167—30

ALBERT T. MEYERS, *Primary Examiner.*

J. D. GOLDBERG, *Assistant Examiner.*